(12) United States Patent
Koerner

(10) Patent No.: US 11,535,281 B2
(45) Date of Patent: Dec. 27, 2022

(54) DRIVE SYSTEM FOR A RAIL VEHICLE, RAIL VEHICLE HAVING THE DRIVE SYSTEM AND METHODS FOR THE FORWARD MOVEMENT OF A RAIL VEHICLE

(71) Applicant: SIEMENS MOBILITY GMBH, Munich (DE)

(72) Inventor: Olaf Koerner, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 754 days.

(21) Appl. No.: 16/506,115

(22) Filed: Jul. 9, 2019

(65) Prior Publication Data
US 2020/0010096 A1 Jan. 9, 2020

(30) Foreign Application Priority Data
Jul. 9, 2018 (EP) .................................... 18182452

(51) Int. Cl.
| | |
|---|---|
| *B61C 3/00* | (2006.01) |
| *H02K 11/33* | (2016.01) |
| *B61C 9/38* | (2006.01) |
| *H02K 7/00* | (2006.01) |
| *H02K 7/116* | (2006.01) |
| *H02K 9/04* | (2006.01) |
| *H02K 9/19* | (2006.01) |

(52) U.S. Cl.
CPC .................. *B61C 3/00* (2013.01); *B61C 9/38* (2013.01); *H02K 7/006* (2013.01); *H02K 7/116* (2013.01); *H02K 9/04* (2013.01); *H02K 9/19* (2013.01); *H02K 11/33* (2016.01)

(58) Field of Classification Search
CPC . B61C 3/00; B61C 9/38; H02K 11/33; H02K 7/006; H02K 7/116; H02K 9/04; H02K 9/19

See application file for complete search history.

(56) References Cited

U.S. PATENT DOCUMENTS

| | | | |
|---|---|---|---|
| 10,093,326 B2 | 10/2018 | Glinka et al. | |
| 2010/0282122 A1* | 11/2010 | Mai .......................... | B60L 7/10 105/1.4 |
| 2012/0318163 A1 | 12/2012 | Ptacek et al. | |

FOREIGN PATENT DOCUMENTS

| | | |
|---|---|---|
| CN | 103042912 A | 4/2013 |
| CN | 203937673 U | 11/2014 |
| CN | 205022582 U | 2/2016 |
| CN | 106809225 A | 6/2017 |
| DE | 202004013186 U1 | 12/2004 |
| DE | 102006032335 A1 | 1/2008 |
| DE | 102010040491 A1 | 3/2012 |
| DE | 102013225913 A1 | 6/2015 |

(Continued)

*Primary Examiner* — Viet P Nguyen
(74) *Attorney, Agent, or Firm* — Laurence A. Greenberg; Werner H. Stemer; Ralph E. Locher

(57) ABSTRACT

A drive system for a rail vehicle includes at least one drive motor and at least one cooling apparatus for cooling the at least one drive motor and/or other components of the drive system, in particular a current converter. The drive system is constructed and intended to use kinetic energy of the rail vehicle for operation of the cooling apparatus. A rail vehicle having the drive system and methods for the forward movement of a rail vehicle are also provided.

9 Claims, 3 Drawing Sheets

(56) References Cited

FOREIGN PATENT DOCUMENTS

DE 102014005236 A1 10/2015
GB 438210 A 11/1935

* cited by examiner

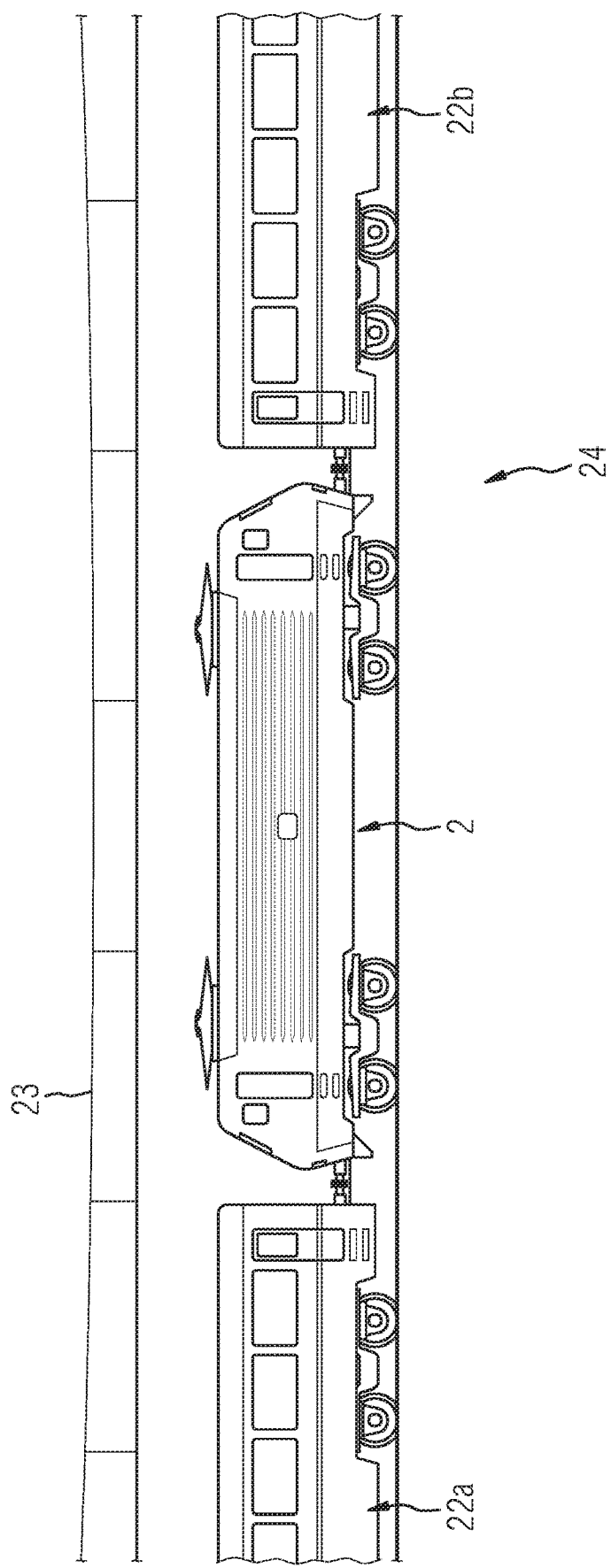

DRIVE SYSTEM FOR A RAIL VEHICLE, RAIL VEHICLE HAVING THE DRIVE SYSTEM AND METHODS FOR THE FORWARD MOVEMENT OF A RAIL VEHICLE

CROSS-REFERENCE TO RELATED APPLICATION

This application claims the priority, under 35 U.S.C. § 119, of European Patent Application EP 18 182 452.5, filed Jul. 9, 2018; the prior application is herewith incorporated by reference in its entirety.

BACKGROUND OF THE INVENTION

Field of the Invention

The invention relates to a drive system for a rail vehicle with at least one drive motor and at least one cooling apparatus for cooling the at least one drive motor and/or other components of the drive system, in particular a current converter. Moreover, the invention relates to a rail vehicle with a drive system according to the invention and methods for the forward movement of a rail vehicle according to the invention.

A sufficient level of cooling must be ensured during the operation of traction motors for rail vehicles. In that context, the cooling should be as reliable, independent of additional components and simple to implement as possible.

The cooling is of particular importance in so-called car locomotives. Those involve locomotives which are completely switched off electrically and are converted into a train in a manner similar to a railroad car in terms of braking technology. If permanent magnet-excited (PM) traction motors, which cannot be uncoupled from the wheelset, are used in the locomotives, then the traction motors co-rotate when the locomotives are used as car locomotives and cause losses inside the motor. Those losses are mainly eddy current and hysteresis losses in the stator iron of the traction motor, which occur as a consequence of the rotating magnetic field.

The losses need to be reliably dissipated from the traction motor so that the motor is not overheated.

Ensuring the cooling of traction motors in which no air cooling is possible by using a self-ventilator on the traction motor shaft, for example for reasons of installation space, is likewise of relevance.

In powered running gear which has a current converter, the reliable cooling of the current converter and any other electrical components additionally must be ensured. A powered running gear of that kind with an integrated current converter is described in German Patent Application DE 10 2013 225 913 A1, corresponding to U.S. Pat. No. 10,093,326, for example.

It is known to use self-ventilated motors to ensure the cooling of the motors mentioned above, for example. In addition, individual components may be cooled by using the air stream (e.g. current converter).

A further known solution is installing an electrical fan or forced ventilation of the motor with fans fixed to the vehicle body. Water cooling of motors using pumps and recooling units fixed to the vehicle body is likewise known.

Installing a fan on the housing of a rail vehicle is known from German Patent Application DE 10 2010 040 491 A1. In that document, an electrically driven vehicle is disclosed having a fan which is coupled to a bull gear of the vehicle drive through a fan pinion, and with an air duct, which guides the air flow generated by the fan to at least one traction motor of the vehicle.

Moreover, in the specific case of car locomotives, asynchronous machines may be employed as a drive, which generate no electromagnetic losses during transportation of the car locomotive. Asynchronous machines, however, entail inherent disadvantages (e.g. losses in the rotors during normal operation) which are known per se, meaning that purely using that drive system for locomotives does not represent a satisfactory solution.

SUMMARY OF THE INVENTION

It is accordingly an object of the invention to provide a drive system for a rail vehicle, a rail vehicle having the drive system and methods for the forward movement of a rail vehicle, which overcome the hereinafore-mentioned disadvantages of the heretofore-known systems, vehicles and methods of this general type and which, in particular, can act autonomously.

With the foregoing and other objects in view there is provided, in accordance with the invention, a drive system for a rail vehicle, comprising at least one drive motor and at least one cooling apparatus for cooling the at least one drive motor and/or other components of the drive system, in particular a current converter, in which the drive system is embodied and intended to use kinetic energy of the rail vehicle for operation of the cooling apparatus.

The rail vehicle may, for example, involve a locomotive which has a drive system with a drive motor. In particular, the rail vehicle may involve a local traffic or regional traffic train or a passenger train or freight train locomotive.

The drive system according to the invention may use the kinetic energy (motion energy) of the rail vehicle, which the rail vehicle has due to a forward movement (active or passive), to realize a cooling of the drive motor and/or other components of the drive system. As a result, a cooling of the mentioned components can be undertaken which is particularly simple, reliable and independent of other energy sources.

The drive motor advantageously involves a permanent magnet-excited motor, which avoids the previously mentioned disadvantages of an asynchronous motor.

The drive system is preferably embodied and intended to exclusively use kinetic energy of the rail vehicle for operation of the cooling apparatus.

The drive system preferably includes an energy conversion apparatus which is connected to the cooling apparatus. In this context, the energy conversion apparatus is embodied and intended to convert kinetic energy of the rail vehicle into a form of energy which is suitable and intended for operation of the cooling apparatus. By using the energy conversion apparatus, the kinetic energy can be converted in virtually any manner into a form which is particularly suitable for operation of the cooling apparatus.

Advantageously, the energy conversion apparatus is a generator for generating electrical energy. By generating electrical energy, the energy conversion apparatus and the cooling apparatus may be disposed virtually independently of one another at different installation locations within the rail vehicle.

A further possible embodiment of the energy conversion apparatus resides in an embodiment as a hydraulic pump, which is embodied and intended for generating a hydraulic circuit.

Particularly preferably, the energy conversion apparatus (generator, hydraulic pump or a comparable apparatus) is installed on a drive shaft and/or a gear unit shaft of the drive system. As an alternative or in addition to this, the energy conversion apparatus may also be disposed on a wheelset shaft of the rail vehicle.

The cooling apparatus may include a ventilation apparatus and/or a fluid cooling apparatus. The ventilation apparatus may involve a fan which is known per se. The fluid cooling apparatus may include a water pump for producing a water circuit for the dissipation of heat from the drive system.

With the objects of the invention in view, there is also provided a rail vehicle, comprising a drive system which has been described above. In this rail vehicle, which is preferably a locomotive, the cooling apparatus is preferably disposed on a running gear and/or a vehicle body of the rail vehicle. As a result of the use of the drive system described above, an installation position of the cooling apparatus within the rail vehicle can be chosen virtually freely. In addition, the cooling apparatus may be operated independently of a rotational speed of the drive motor and/or a wheelset of the rail vehicle.

With the objects of the invention in view, there is furthermore provided a method for the forward movement of a previously described (first) rail vehicle, the at least one drive motor of the rail vehicle is cooled by using the at least one cooling apparatus.

With the objects of the invention in view, there is concomitantly provided a further method, in which the first rail vehicle is connected to at least one second rail vehicle, which has a drive system. Both interconnected rail vehicles are subsequently moved forward by using a tractive force of the drive system of the second rail vehicle. In this context, the at least one drive motor is cooled by using the at least one cooling apparatus.

Other features which are considered as characteristic for the invention are set forth in the appended claims.

Although the invention is illustrated and described herein as embodied in a drive system for a rail vehicle, a rail vehicle having the drive system and a method for the forward movement of a rail vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The above-described properties, features and advantages of this invention and the manner in which these are achieved will be described more clearly and explicitly with the following description of the exemplary embodiments, which are explained in more detail with the drawings.

BRIEF DESCRIPTION OF THE SEVERAL VIEWS OF THE DRAWING

FIG. 3 is a reduced, side-elevational view of a configuration of a locomotive as a car locomotive.

DETAILED DESCRIPTION OF THE INVENTION

Figure 1:
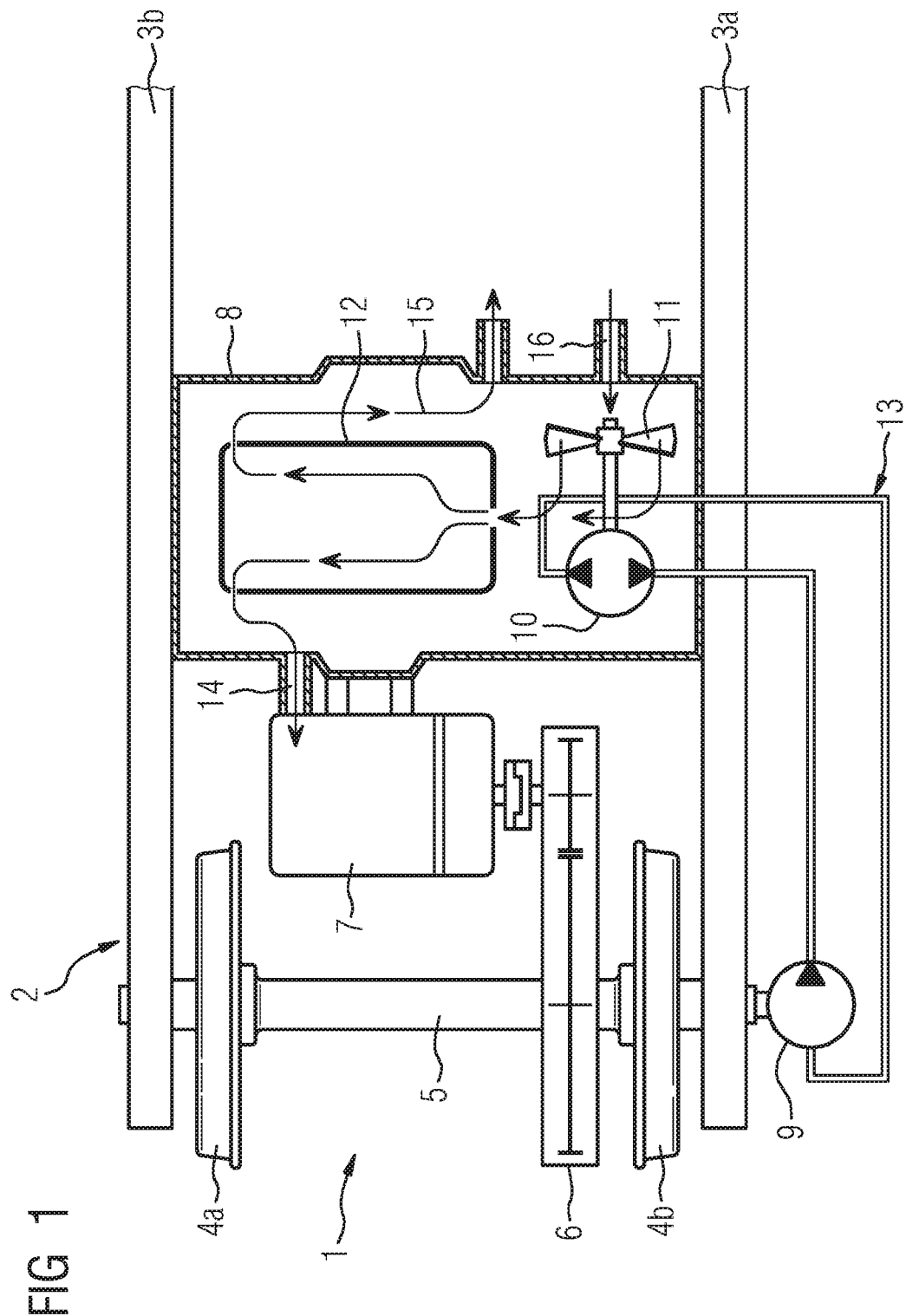
FIG. 1 is a diagrammatic, plan view of a drive system of a rail vehicle according to the invention with a ventilation apparatus.

Referring now to the figures of the drawings in detail and first, particularly, to FIG. 1 thereof, there is seen a drive system 1 of a rail vehicle 2 according to the invention. The rail vehicle 2 represents a locomotive in this figure. The running gear thereof is represented by way of indicating second solebars 3a, 3b, a center sill 8 and two wheels 4a, 4b. FIG. 1 shows a plan view of the drive system 1 of the rail vehicle 2. Conventionally, a rail vehicle 2 has a plurality of (similar or different) drive systems 1, according to FIG. 1. However, the representation thereof has been dispensed with for the sake of clarity.

The drive system 1 represented in FIG. 1 includes a wheelset shaft 5, a gear unit 6 and a motor 7. The motor 7 drives the wheelset shaft 5 by using the gear unit 6 in a manner which is known per se, and the gear unit 6 in turn sets the wheels 4a, 4b in motion.

The rail vehicle 2 according to the invention additionally includes a hydraulic pump 9, a hydraulic motor 10, a fan 11 and a current converter 12. The hydraulic pump 9 is mechanically connected to the wheelset shaft 5 in such or activate a hydraulic circuit 13. The hydraulic motor 10 is driven by using the hydraulic circuit 13 and in turn is mechanically connected to the fan 11 in such a way that the hydraulic motor 10 causes the fan 11 to rotate.

The fan 11 is disposed within the center sill 8, which forms a housing 8 with interior hollow gaps. The current converter 12 is also disposed within the housing 8. The center sill 8 has a first opening 14, through which air is able to flow from the interior of the housing onto or into the motor 7. Furthermore, the center sill 8 has a second opening 16, through which air is able to be drawn in from the surrounding environment into the interior of the housing 8.

An air flow 15 arises within the center sill by way of a forced movement caused by the fan 11. In this context, air is drawn in through the second opening 16 into the interior of the housing 8 and directed by the fan 11 first onto the current converter 12 and then through the first opening 14 onto the motor 7. Without departing from the framework of the invention, the fan may also be directed into separate flow ducts toward the current converter 12 and motor 7.

Viewed as a whole, the drive system 1 of the rail vehicle 2 converts the motion energy (kinetic energy), which results from the forward movement of the rail vehicle 2, first into hydraulic energy and subsequently into a rotational energy of the fan 11, which is used as a cooling apparatus for cooling the (drive) motor 7. Additionally, the current converter 12 may be cooled by using the fan 11 as a further component of the drive system 1 or of the rail vehicle 2.

In this context, in the present exemplary embodiment, the kinetic energy of the rail vehicle 2 is exclusively used for cooling.

Figure 2:
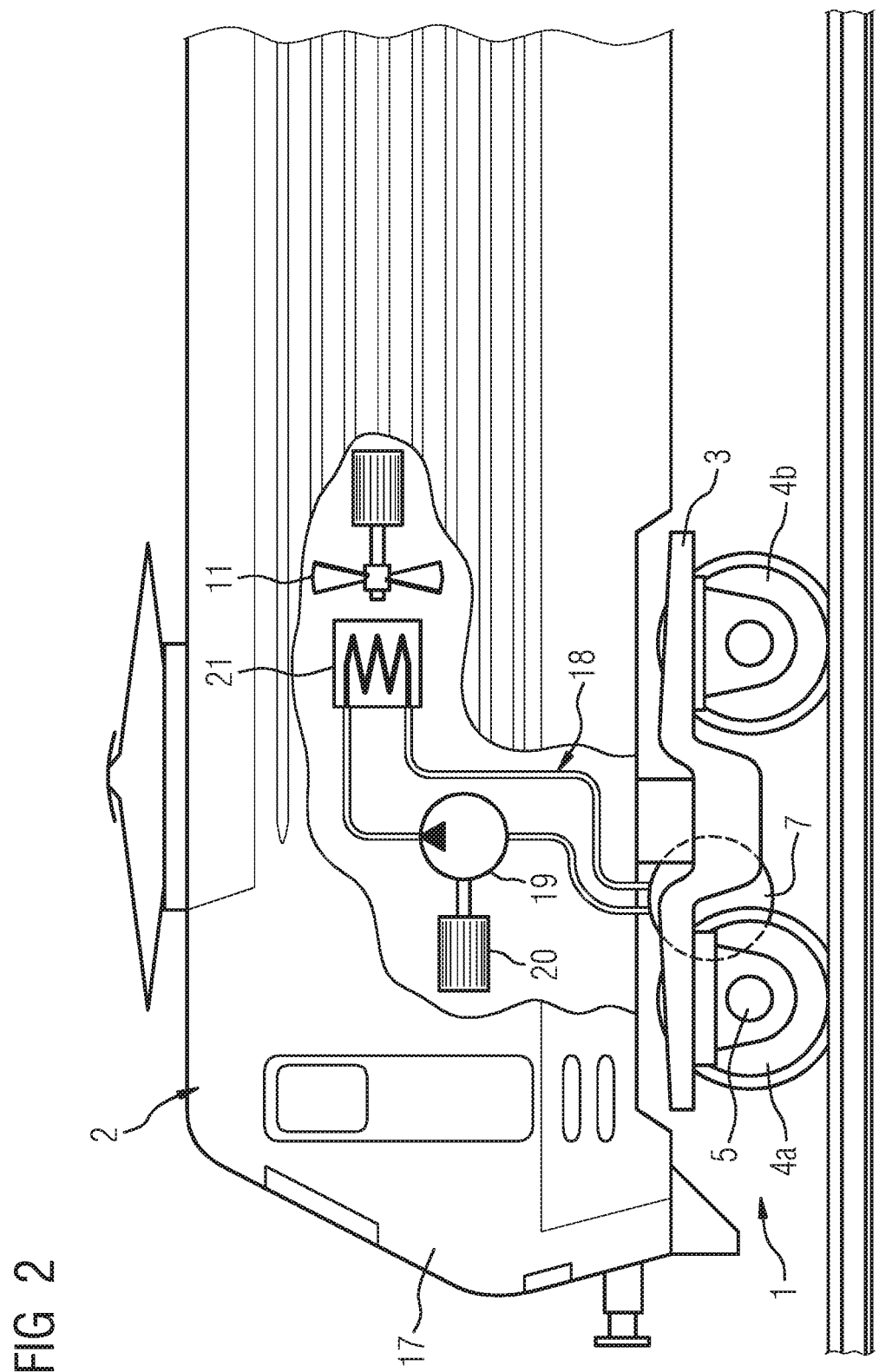
FIG. 2 is a fragmentary, side-elevational view of a drive system of a rail vehicle according to the invention with a fluid cooling apparatus.

FIG. 2 shows a further drive system 1 of a rail vehicle 2 according to the invention. The rail vehicle 2 represents a locomotive and in FIG. 2 is represented by way of indicating a running gear solebar 3 and an upper structure 17 (locomotive body) as well as two wheels 4a, 4b.

The drive system 1 drives a wheelset shaft 5 by using a drive motor 7, which in particular may be a permanent magnet-excited motor 7, and a non-illustrated gear unit. The drive motor 7 is connected to a fluid cooling apparatus or a fluid cooling system 18.

The fluid cooling system 18 includes a fluid pump 19, which is operated by using a motor 20. The fluid pump 19 guides fluid through the drive motor 7, where a heating of the fluid due to heat losses of the drive motor 7 takes place in a manner which is known per se. The heated fluid is supplied to a heat exchanger or recooler 21. There, the output heat of the fluid is dissipated with the aid of a fan 11. Subsequently, the cooled fluid is supplied to the drive motor 7 again.

The motor 20 of the fluid pump 19 and the fan 11 are supplied with electrical energy by using a non-illustrated generator. The generator in turn uses the rotational energy of the wheelset shaft 5 to generate the electrical energy. It is likewise possible to use a hydraulic circuit 13 which has already been explained above to drive the motor 20 and the fan 11.

FIG. 3 shows an application example for a drive system 1 according to the invention. A locomotive 2, which is shown in FIG. 3, functions as a so-called car locomotive. This involves a locomotive 2, which is completely switched off electrically (there is no connection to a high voltage line 23) and is converted into a train 24 in a manner similar to a railroad car in terms of braking technology. The locomotive 2 is connected to a first railroad car 22a and a second railroad car 22b, which in turn may be part of a larger chain of railroad cars.

If one or more permanent magnet-excited (PM) traction motors, which cannot be uncoupled from the wheelset, are used in the locomotive 2, then the traction motors co-rotate when the locomotive 2 is used as a car locomotive and causes losses inside the motor. These losses are mainly eddy current and hysteresis losses in the stator iron of the traction motor, which occur as a consequence of the rotating magnetic field.

Particularly advantageously, a drive system 1 according to the invention can be employed in this configuration, so that a simple and efficient cooling of the traction motors can be ensured.

Although the invention has been illustrated and described in detail by using the preferred exemplary embodiments, the invention is not restricted by the examples disclosed and other variations can be derived therefrom by a person skilled in the art without departing from the protective scope of the invention.

The invention claimed is:

1. A drive system for a rail vehicle configured as a car locomotive, the drive system comprising:
   at least one permanent magnet-excited drive motor without self-ventilation;
   at least one cooling apparatus for cooling said at least one drive motor;
   said at least one cooling apparatus configured to be operated exclusively by kinetic energy of the rail vehicle during operation of the rail vehicle as a car locomotive.

2. The drive system according to claim 1, which comprises an energy conversion device which is connected to cooling apparatus, said energy conversion apparatus configured to convert the kinetic energy of the rail vehicle into a form of energy being suitable for operation of said at least one-cooling apparatus.

3. The drive system according to claim 2, wherein said energy conversion apparatus is a generator for generating electrical energy.

4. The drive system according to claim 2, wherein said energy conversion apparatus is a hydraulic pump for generating a hydraulic circuit.

5. The drive system according to claim 2, which further comprises a drive shaft, a gear unit shaft and a wheelset shaft, said energy conversion apparatus being disposed on at least one of said drive shaft or said-gear unit shaft or said wheelset shaft.

6. The drive system according to claim 1, wherein said at least one cooling apparatus includes at least one of a ventilation apparatus or a fluid cooling apparatus.

7. A rail vehicle, comprising a drive system according to claim 1.

8. The rail vehicle according to claim 7, which further comprises a running gear and a vehicle body, said at least one cooling apparatus being disposed on at least one of said running gear or said vehicle body.

9. A method for the forward movement of a first rail vehicle, the method comprising the following steps:
   providing a first rail vehicle including a drive system according to claim 1;
   connecting the first rail vehicle to at least one second rail vehicle having a drive system;
   using a tractive force of the drive system of the second rail vehicle to move the interconnected rail vehicles forward; and
   using the at least one cooling apparatus to cool the at least one drive motor.

* * * * *